United States Patent
Mu

(10) Patent No.: US 12,526,773 B2
(45) Date of Patent: Jan. 13, 2026

(54) METHOD AND DEVICE FOR RESOURCE CONFIGURATION

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 355 days.

(21) Appl. No.: 18/029,013

(22) PCT Filed: Sep. 30, 2020

(86) PCT No.: PCT/CN2020/119671
§ 371 (c)(1),
(2) Date: Mar. 28, 2023

(87) PCT Pub. No.: WO2022/067768
PCT Pub. Date: Apr. 7, 2022

(65) Prior Publication Data
US 2023/0371006 A1  Nov. 16, 2023

(51) Int. Cl.
*H04W 72/04* (2023.01)
*H04W 72/12* (2023.01)
*H04W 72/232* (2023.01)

(52) U.S. Cl.
CPC ........... *H04W 72/04* (2013.01); *H04W 72/12* (2013.01); *H04W 72/232* (2023.01)

(58) Field of Classification Search
CPC ............. H04W 72/12; H04W 72/0453; H04W 72/232; H04W 72/04; H04L 5/001; H04L 5/0007; H04L 5/0037; H04L 5/0044; H04L 5/0053
See application file for complete search history.

(56) References Cited

U.S. PATENT DOCUMENTS

| | | |
|---|---|---|
| 2019/0132109 A1 | 5/2019 | Zhou et al. |
| 2019/0149305 A1* | 5/2019 | Zhou ................... H04L 27/2666 370/330 |
| 2019/0268905 A1 | 8/2019 | Zhou et al. |
| 2019/0357215 A1 | 11/2019 | Zhou et al. |
| 2021/0184824 A1* | 6/2021 | Kwak ................... H04L 5/0092 |

FOREIGN PATENT DOCUMENTS

| | | |
|---|---|---|
| CN | 110519853 A | 11/2019 |
| CN | 110972267 A | 4/2020 |
| WO | WO 2019153192 A1 | 8/2019 |

OTHER PUBLICATIONS

Indian Patent Application No. 202347026071, Office Action dated Nov. 8, 2023, 6 pages.
PCT/CN2020/119671 English translation of Search Report dated Jun. 23, 2021, 3 pages.

* cited by examiner

*Primary Examiner* — Sulaiman Nooristany
(74) *Attorney, Agent, or Firm* — Cozen O'Connor

(57) ABSTRACT

A method and device for resource configuration are disclosed. A terminal determines a first bandwidth part and at least one second bandwidth part. At least some of configuration parameters of the first bandwidth part and each of the second bandwidth part are same.

11 Claims, 3 Drawing Sheets

METHOD AND DEVICE FOR RESOURCE CONFIGURATION

CROSS-REFERENCE TO RELATED APPLICATION

This application is the US national phase application of International Application No. PCT/CN2020/119671, filed on Sep. 30, 2020, the entire contents of which are incorporated herein by reference for all purposes.

TECHNICAL FIELD

The present disclosure relates to a field of wireless communication technologies, and particularly to a method and device for resource configuration, and a storage medium.

BACKGROUND

In a wireless communication system, a machine type communication (MTC) technology and a narrow band Internet of Things (NB-IoT) technology are provided in low-rate, high-latency and other scenarios that are common features of an Internet of Things service.

Due to ongoing development of the Internet of Things applications, new devices, or terminals, are being used that place different requirements on the wireless communication system. Thus, the MTC and NB-IoT technologies cannot satisfy requirements of a current IoT service of rate and latency. Therefore, a new reduced capability (Redcap) terminal, simply referred to as NR-lite, is designed to cover the service requirements of IoT applications. Due to low cost and low complexity requirements of the Redcap terminal, they have a limited bandwidth for sending and receiving data, which further results in loss of a frequency selective gain and/or a frequency diversity gain.

SUMMARY

According to a first aspect of embodiments of the present disclosure, a method for resource configuration is provided. The method is applied to a terminal, and the method includes:
determining a first bandwidth part BWP and at least one second BWP, in which at least some of configuration parameters of the first BWP and each of the second BWP are same.

According to a second aspect of embodiments of the present disclosure, a device for resource configuration is provided. The device includes:
a processor; and a memory configured to store instructions executable by the processor; in which, the processor is configured to:
determine a first BWP and at least one second BWP, wherein at least some of configuration parameters of the first BWP and each of the second BWP are same.

According to a third aspect of embodiments of the present disclosure, a non-transitory computer readable storage medium is provided. When instructions in the storage medium are executed by a processor, the processor is configured to:
determine a first BWP and at least one second BWP, wherein at least some of configuration parameters of the first BWP and each of the second BWP are same.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

DETAILED DESCRIPTION

Figure 1:
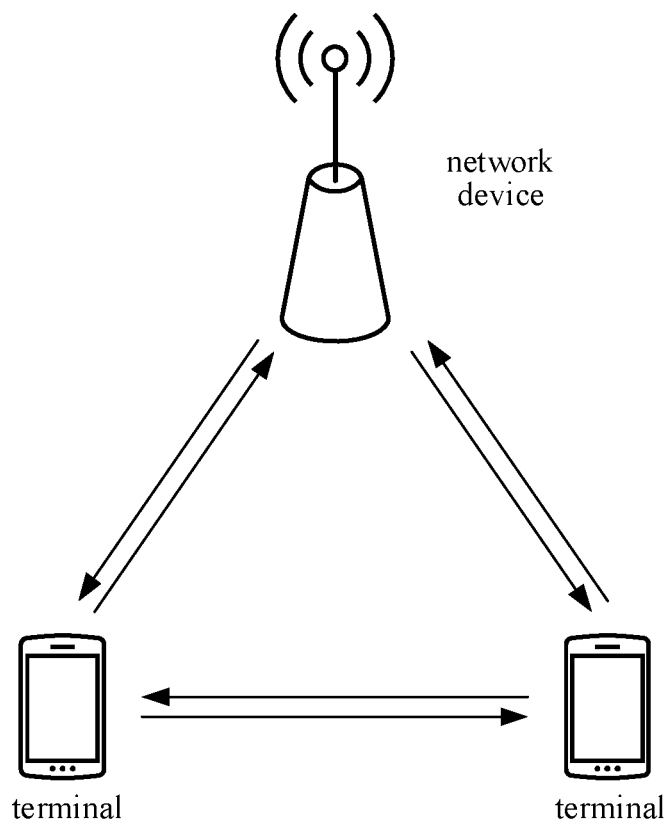
FIG. 1 is an architecture diagram illustrating a communication system between a network device and terminals according to an embodiment.

The embodiments will be described in detail here, and examples thereof are shown in the accompanying drawings. When the following descriptions refer to the accompanying drawings, same numbers in different drawings represent same or similar elements unless otherwise indicated. The implementations described in the following embodiments do not represent all implementations consistent with the present disclosure. Rather, they are merely examples of apparatuses and methods consistent with some aspects of the disclosure as detailed in the appended claims.

In a communication system, MTC and NB-IoT technologies are proposed in the related art for low-rate and high-latency scenarios (such as meter reading and environmental monitoring) in an Internet of Things service. At present, the NB-IoT technology may support a maximum data rate of several hundred kilobytes (K), and the MTC may support a maximum data rate of several megabytes (M). However, with continuous development of the Internet of Things service (for example, monitoring, smart home, wearable devices, and industrial sensor detection, etc.), a rate of dozens to one hundred M is generally required, and a requirement for latency is also relatively improved. Therefore, in a communication system, MTC and NB-IoT technologies have not satisfied the requirements of a current Internet of Things service. Therefore, a new user equipment designed in a new radio communication system is provided to cover a rate of dozens to one hundred M and have a service requirement of a middle-end Internet of Things device with a higher latency at the same time. At present, in 3rd Generation Partnership Project (3GPP) standardization, a user equipment that covers the rate of dozens to one hundred M and has the service requirement of the middle-end Internet of Things device with a higher latency is referred to as a reduced capability UE (referred to as a Redcap terminal or NR-lite in short).

At the same time, on the other hand, the NR-lite generally requires to satisfy the requirements of low cost, low complexity, coverage enhancement to a certain degree and power saving. However, a new radio communication technology is designed for a high-end terminal with a high rate and a low latency, and may not satisfy the above requirements of the NR-lite. Therefore, a current new radio communication technology needs to be improved to satisfy the above requirements of the NR-lite. For example, based on the requirements of low cost and low complexity, a radio frequency (RF) bandwidth of the NR-IoT may be limited (for example, limited to 5 MHz or 10 MHz, or a size of a buffer of the NR-lite is limited), and further a size of a transmission block received each time is limited, etc. For another example, a communication process may be simplified based on the requirement of power saving, to reduce a number of times for which an NR-lite user detects a downlink control channel, etc. At the same time, a limitation of a bandwidth of a Redcap terminal results in loss of a frequency selective gain and/or a frequency diversity gain.

In the related art, in order to avoid the loss of the frequency selective gain or the frequency diversity gain, more than one BWP is configured for the terminal, so that the terminal performs BWP switch among the more than one BWP. However, it relates to resynchronization and other signal detections in the BWP switch. Also, a guard period for switching between different BWPs is large, resulting in an interrupt of communication between terminals. Therefore, a method for resource configuration is provided in the disclosure, to solve the problem that the guard period for switching between different BWPs is large. FIG. 1 is an architecture diagram illustrating a communication system between a network device and terminals according to an embodiment. A communication method provided in embodiments of the present disclosure is applicable to the architecture diagram of the communication system as illustrated in FIG. 1. As illustrated in FIG. 1, a terminal receives a broadcast message of a system sent by a network device, and/or control information of the terminal, and/or performs a synchronization.

It may be understood that, the network system and the communication system of the terminal as illustrated in FIG. 1 are only illustrated, and the wireless communication system further may include other network devices, for example, a core network device, a wireless relay device, and a wireless backhaul device, that are not shown in FIG. 1. A number of network devices and a number of terminals included in the wireless communication system are not limited in embodiments of the present disclosure.

It may be further understood that, the wireless communication system in embodiments of the present disclosure is a network that provides a wireless communication function. The wireless communication system may adopt different communication technologies, such as, code division multiple access (CDMA), wideband code division multiple access (WCDMA), time division multiple access (TDMA), frequency division multiple access (FDMA), orthogonal frequency-division multiple access (OFDMA), single Carrier FDMA (SC-FDMA) and carrier sense multiple access with collision avoidance. Based on capacities, rates, latencies and other factors of different networks, a network may be divided into a 2G (generation) network, a 3G network, a 4G network, or a future evolution network, for example a 5G network, which may also be referred to as a new radio (NR) network. For ease of description, a wireless communication network is simply referred to as a network in the disclosure sometimes.

Further, the network device involved in the present disclosure may also be referred to as a wireless access network device. The wireless access network device may be an access point (AP), a wireless relay node, a wireless backhaul node, a transmission point (TP), or a transmission and reception point (TRP), etc., in a base station, an evolved node B (a base station), a home base station and a WiFi system, or a gNB in an NR system, or may also be a component constituting a base station or a part of a device. The network device further may be a vehicle-mounted device in an Internet of Vehicles (V2X) communication system. It should be understood that, a specific technology and a specific device form adopted by the network device are not limited in embodiments of the present disclosure.

Further, the terminal involved in the present disclosure further may be referred to as a terminal device, a user equipment (UE), a mobile station (MS), a mobile terminal (MT), etc., and is a device that provides voice and/or data connectivity to a user, for example, the terminal may be a handheld device with a wireless connection function or a vehicle-mounted device, etc. At present, some terminals include, for example, a mobile phone, a pocket personal computer (PPC), a palm computer, a personal digital assistant (PDA), a notebook computer, a tablet computer, a wearable device, or a vehicle-mounted device. In addition, the terminal device further may be a vehicle-mounted device in an Internet of Vehicles (V2X) communication system. It should be understood that, a specific technology and a specific device form adopted by a terminal are not limited in the embodiments of the present disclosure.

Figure 2:
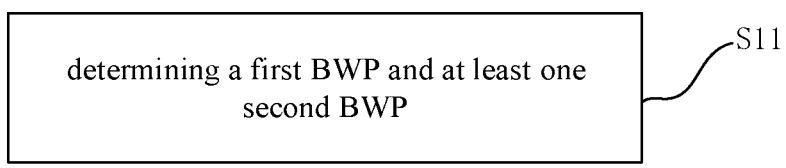
FIG. 2 is a flowchart illustrating a method for resource configuration according to an embodiment.

FIG. 2 is a flowchart illustrating a method for resource configuration according to an embodiment. As illustrated in FIG. 2, the method for resource configuration is applied to a terminal. The method includes the following steps.

At step S11, a first BWP and at least one second BWP are determined.

In embodiments of the present disclosure, some or all of configuration parameters of the first BWP and each of the second BWP are same. When the first BWP and each second BWP are configured for the terminal, it may be configured that the bandwidth of each second BWP is less than or equal to that of the first BWP. It may be understood that center frequency points of the first BWP and each second BWP are different, and the center frequency points that the different second BWPs have are different. The terminal only needs to perform switch based on the center frequency points when performing BWP switch, thereby saving the time for which the terminal performs BWP switch.

In some embodiments, in addition to the different center frequency points, other configuration parameters of the first BWP and the at least one second BWP are same. In some other embodiments, in addition to different center frequency points, some of the other configuration parameters of the first BWP and each second BWP are same. It may be understood that the configuration parameters may include at least one of:

a bandwidth, a subcarrier spacing, or a downlink physical channel parameter (such as a relative frequency domain position, a number of symbols occupied by a transmission content, a duration, a channel mapping mode and a transmission mode).

In embodiments of the present disclosure, there can be one or more second BWPs. In some embodiments, other configuration parameters of the more than one second BWP are same, and only center frequency points are different. In some other embodiments, only a part of the other configuration parameters of the more than one second BWP are same, and the center frequency points are different. For example, at least one second BWP with bandwidth range as same as that of the first BWP may be determined, and at least one second BWP with bandwidth range less than that of the first BWP may be determined.

In embodiments of the present disclosure, an active BWP always resided by the terminal is determined, further the related configuration parameters of the active BWP resided by the terminal are determined. Based on the related configuration parameters of the active BWP, at least one BWP of which the bandwidth is less than or equal to the active BWP is configured for the terminal. In order to facilitate description, the active BWP resided by the terminal is determined as the first BWP, and the BWP configured for the terminal and less than or equal to the active BWP is determined as a second BWP. A BWP less than or equal to the active BWP may also be referred to as a narrowband.

In some embodiments of the present disclosure, the first BWP may be configured to transmit a signaling, for example, a system broadcast message, control information of a terminal and synchronization information. The second BWP may be configured to transmit data. In the present disclosure, the first BWP and the second BWP are configured to transmit a control message and a data message respectively. Specifically, the first BWP is configured to transmit a signaling; and based on the control message received by the first BWP, the terminal transmits data in a corresponding second BWP. The terminal may select one or more BWPs with a relatively good channel quality in the more than one second BWP to transmit data. In embodiments of the present disclosure, the signaling the first BWP is configured to transmit may be any form of signaling, for example, a control signaling.

In some embodiments of the present disclosure, when at least one second BWP transmits data, the terminal may measure a channel condition of the at least one second BWP for transmitting data, and determine channel status information (CSI) of the at least one second BWP for transmitting data. The terminal may send a first message to be scheduled by a network side device to the network side device, and inform the network the channel status information of the at least one second BWP for transmitting the data message. The first message is configured to report the channel status information of the at least one second BWP, so that the network side device performs scheduling among more than one candidate second BWP. The network side determines the channel status information of each of the second BWP for transmitting the data message, and performs data scheduling based on the channel status information of the at least one second BWP. In embodiments of the present disclosure, the channel status information is reported for each of the second BWP, so that network side device performs scheduling among more than one candidate second BWP.

In embodiments of the present disclosure, the channel status information may be reported by means of a physical downlink channel. A time-frequency domain position for reporting the channel status information in the physical downlink channel may be indicated by the network side device, and may be determined based on predefined information and a related communication protocol.

In some embodiments of the present disclosure, the terminal may continue monitoring a physical downlink control channel (PDCCH) in an active BWP in response to a completion of data transmission of the second BWP. In some embodiments of the present disclosure, the terminal may continue monitoring a PDCCH in an active BWP in response to a completion of channel quality measurement of the second BWP.

In embodiments of the present disclosure, when more than one data is transmitted based on different second BWPs, it is determined whether the more than one data being scheduled includes a fully or partially repetitive transmission. When the more than one data being scheduled includes a repetitive transmission performed on the second BWP, the more than one repetitive transmission may perform frequency hopping transmission on more than one data among different second BWPs. For example, when the number of times of the repetitive transmission of the more than one data being scheduled is 8, the repetitive frequency hopping transmission may be performed on four second BWPs.

The method for resource configuration provided in embodiments of the present disclosure can be applied in a cross-slot scheduling mode. The cross-slot scheduling mode is that a control signaling used for scheduling and scheduled data are in different slots. A downlink cross-slot scheduling refers to that a PDCCH in a current slot schedules physical downlink shared channels (PDSCHs) in subsequent different slots. An uplink cross-slot scheduling refers to that a PDCCH in a current slot schedules physical uplink shared channels (PUSCHs) in subsequent different slots.

Based on the same conception, an apparatus for resource configuration is further provided in embodiments of the present disclosure.

It may be understood that, the apparatus for resource configuration provided in embodiments of the present disclosure includes hardware structures and/or software modules that perform corresponding functions in order to achieve the above functions. In combination with modules and algorithm steps of examples described in embodiments of the present disclosure, the embodiments of the present disclosure may be implemented in the form of a hardware or a combination of a hardware and a computer software. Whether a certain function is executed by a hardware or a computer software driving a hardware depends on specific applications and design constraints of the technical solution. Those skilled in the art may adopt different methods for each specific application to implement the described functions, but such implementation should not be considered as beyond the scope of the technical solutions in embodiments of the present disclosure.

Figure 3:
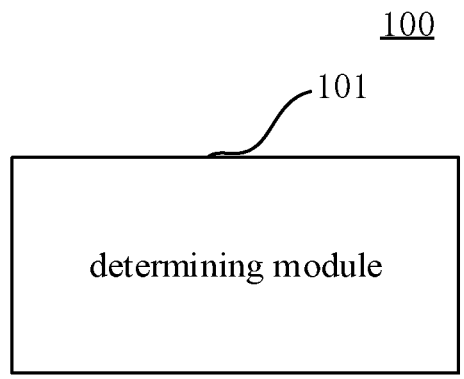
FIG. 3 is a block diagram illustrating an apparatus for resource configuration according to an embodiment.

FIG. 3 is a block diagram illustrating an apparatus 100 for resource configuration according to an embodiment. As illustrated in FIG. 3, the apparatus includes a determining module 101.

The determining module 101 is configured to determine a first BWP and at least one second BWP. At least some of configuration parameters the first BWP and each of the second BWP are same.

In embodiments of the present disclosure, the first BWP is an active BWP for control signaling transmission resided by the terminal, and the second BWP is a BWP for data transmission of the terminal.

In embodiments of the present disclosure, the first BWP is an active BWP for control signaling transmission resided by the terminal. The signaling includes at least one of:
 a broadcast message; control information related to the terminal; or synchronization information.

In embodiments of the disclosure, the apparatus for resource configuration further includes:
 measuring channel status information of each second BWP.

In embodiments of the disclosure, the apparatus for resource configuration further includes:
 sending a first message used for scheduling of a network side device. The first message is configured to report the channel status information of each second BWP, so that the network side device schedules based on each second BWP.

In embodiments of the disclosure, the apparatus for resource configuration further includes:

monitoring a PDCCH on the first BWP in response to a completion of data transmission of the second BWP; or monitoring the PDCCH on the first BWP in response to a completion of channel condition measurement.

In embodiments of the present disclosure, the determining module 101 is configured to:

transmit more than one data in different second BWPs, in response to a repetitive transmission of the more than one data.

In embodiments of the present disclosure, the resource configuration apparatus is applied in a cross-slot scheduling mode; the cross-slot scheduling mode is that a control signaling used for scheduling and scheduled data are in different slots.

In embodiments of the present disclosure, the configuration parameters include at least one:

a bandwidth, a subcarrier spacing, or a downlink physical channel parameter.

With regard to the apparatus in the above embodiments, the specific way in which each module performs the operation has been described in detail in the embodiments of the method and will not be elaborated here.

Figure 4:
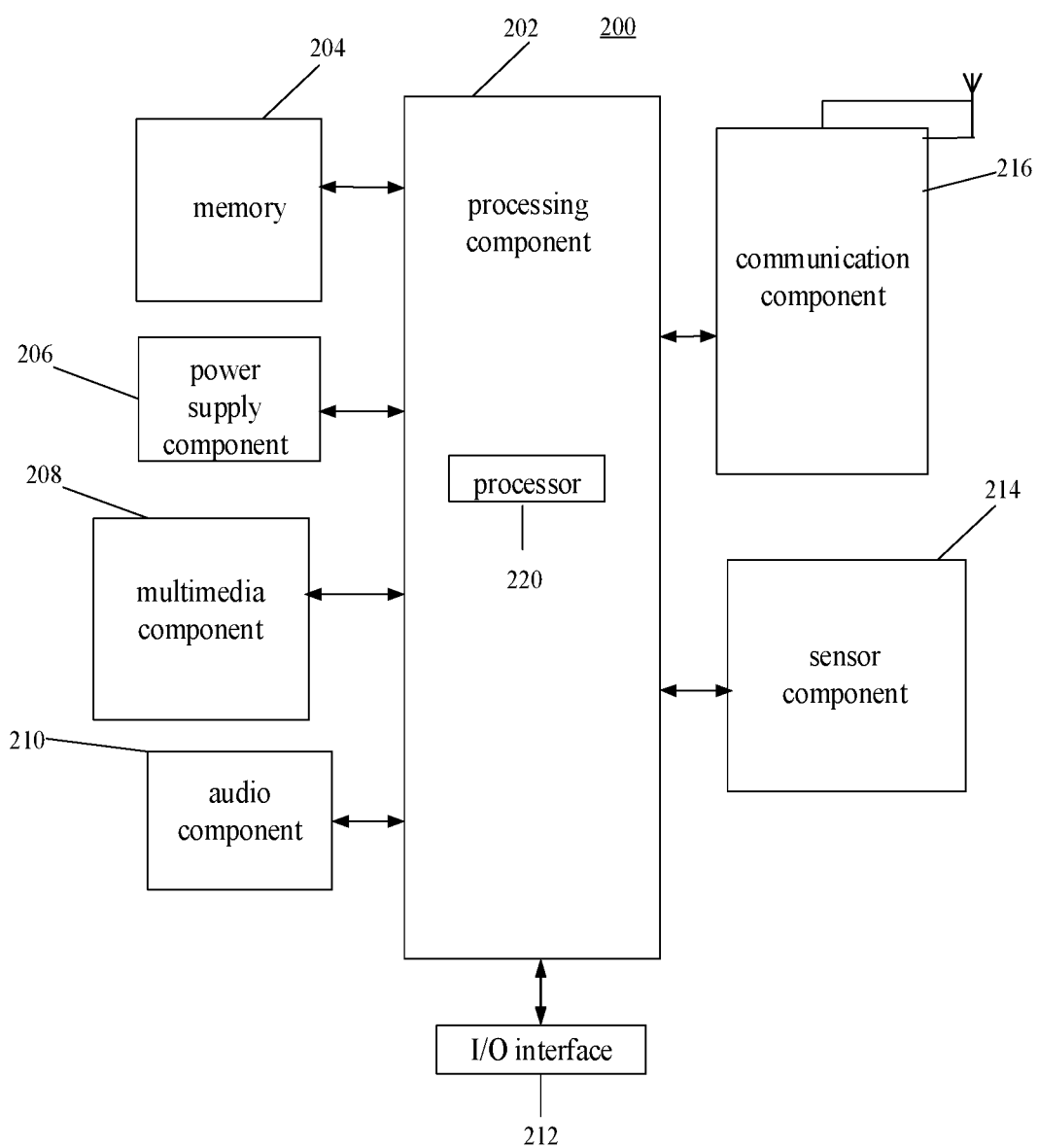
FIG. 4 is a block diagram illustrating a device for resource configuration according to an embodiment.

FIG. 4 is a block diagram illustrating a device 200 for resource configuration according to an embodiment. For example, the device 200 may be a mobile phone, a computer, a digital broadcasting terminal, a messaging device, a game console, a tablet device, a medical equipment, a fitness equipment, a personal digital assistant, etc.

As illustrated in FIG. 4, the device 200 may include one or more components: a processing component 202, a memory 204, a power supply component 206, a multimedia component 208, an audio component 210, an input/output (I/O) interface 212, a sensor component 214, and a communication component 216.

The processing component 202 generally controls the whole operation of the device 200, such as operations related to display, phone call, data communication, camera operation and recording operation. The processing component 202 may include one or more processors 220 to perform instructions, to complete all or part of steps of the above method. In addition, the processing component 202 may include one or more modules for the convenience of interaction between the processing component 202 and other components. For example, the processing component 202 may include a multimedia module for the convenience of interaction between the multimedia component 208 and the processing component 202.

The memory 204 is configured to store all types of data to support the operation of the device 200. Examples of the data include the instructions of any applications or methods operated on the device 200, contact data, phone book data, messages, pictures, videos, etc. The memory 204 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 206 may provide power supply for all components of the device 200. The power supply component 206 may include a power supply management system, one or more power supplies, and other units related to generating, managing and distributing power for the device 200.

The multimedia component 208 includes an output interface screen provided between the device 200 and the user. In some embodiments, a screen may include a liquid crystal display (LCD) and a touch panel (TP). When the screen includes a touch panel, the screen may be implemented as a touch screen to receive input signals from the user. The touch panel includes one or more touch sensors to sense touch, slide and gestures on the touch panel. The touch sensor may not only sense the boundary of touch or slide action, but also detect the duration and pressure related to the touch or slide operation. In some embodiments, the multimedia component 208 includes a front camera and/or a rear camera. When the device 200 is in an operation mode, such as a shooting mode or a video mode, the front camera or the rear camera may receive external multimedia data. Each front camera and rear camera may be a fixed optical lens system or an optical lens system with a focal length and an optical zoom capacity.

The audio component 210 is configured as an output and/or input signal. For example, the audio component 210 includes a microphone (MIC). When the device 200 is in an operation mode, such as a call mode, a record mode, and a speech recognition mode, the microphone is configured to receive external audio signals. The audio signals received may be further stored in the memory 204 or sent via the communication component 216. In some embodiments, the audio component 210 further includes a speaker configured to output an audio signal.

The I/O interface 212 provides an interface for the processing component 202 and the peripheral interface module, and the peripheral interface module may be a keyboard, a click wheel, a button, etc. The buttons may include but not limited to a home button, a volume button, a start button and a lock button.

The sensor component 214 includes one or more sensors, configured to provide various aspects of status assessment for the device 200. For example, the sensor component 214 may detect the on/off state of the device 200 and the relative positioning of the component. For example, the component is a display and a keypad of the device 200. The sensor component 214 may further detect the location change of the device 200 or one component of the device 200, the presence or absence of contact between the user and the device 200, the orientation or acceleration/deceleration of the device 200, and the temperature change of the device 200. The sensor component 214 may include a proximity sensor, which is configured to detect the existence of the objects nearby without any physical contact. The sensor component 214 may further include a light sensor such as a CMOS or CCD image sensor, which is configured in imaging applications. In some embodiments, the sensor component 214 may further include an acceleration transducer, a gyroscope sensor, a magnetic sensor, a pressure sensor or a temperature sensor.

The communication component 216 is configured for the convenience of wire or wireless communication between the device 200 and other devices. The device 200 may access wireless networks based on communication standard, such as WiFi, 2G or 3G, or their combination. In an embodiment, the communication component 216 receives broadcast signals or broadcast-related information from an external broadcast management system via a broadcast channel. In an example embodiment, the communication component 216 further includes a near field communication (NFC) module to facilitate short-range communication. For example, an NFC module may be implemented based on radio frequency identification (RFID) technology, infrared data association (IRDA) technology, ultra-wideband (UWB) technology, bluetooth (BT) technology and other technologies.

In an embodiment, the device 200 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above method.

In an embodiment, a non-transitory computer readable storage medium including instructions is further provided, such as the memory 204 including instructions. The instructions may be executed by the processor 220 of the device 200 to complete the above methods. For example, the non-transitory computer readable storage medium may be a ROM, a random access memory (RAM), a CD-ROM, a magnetic tape, a floppy disk, an optical data storage device, etc.

Figure 5:
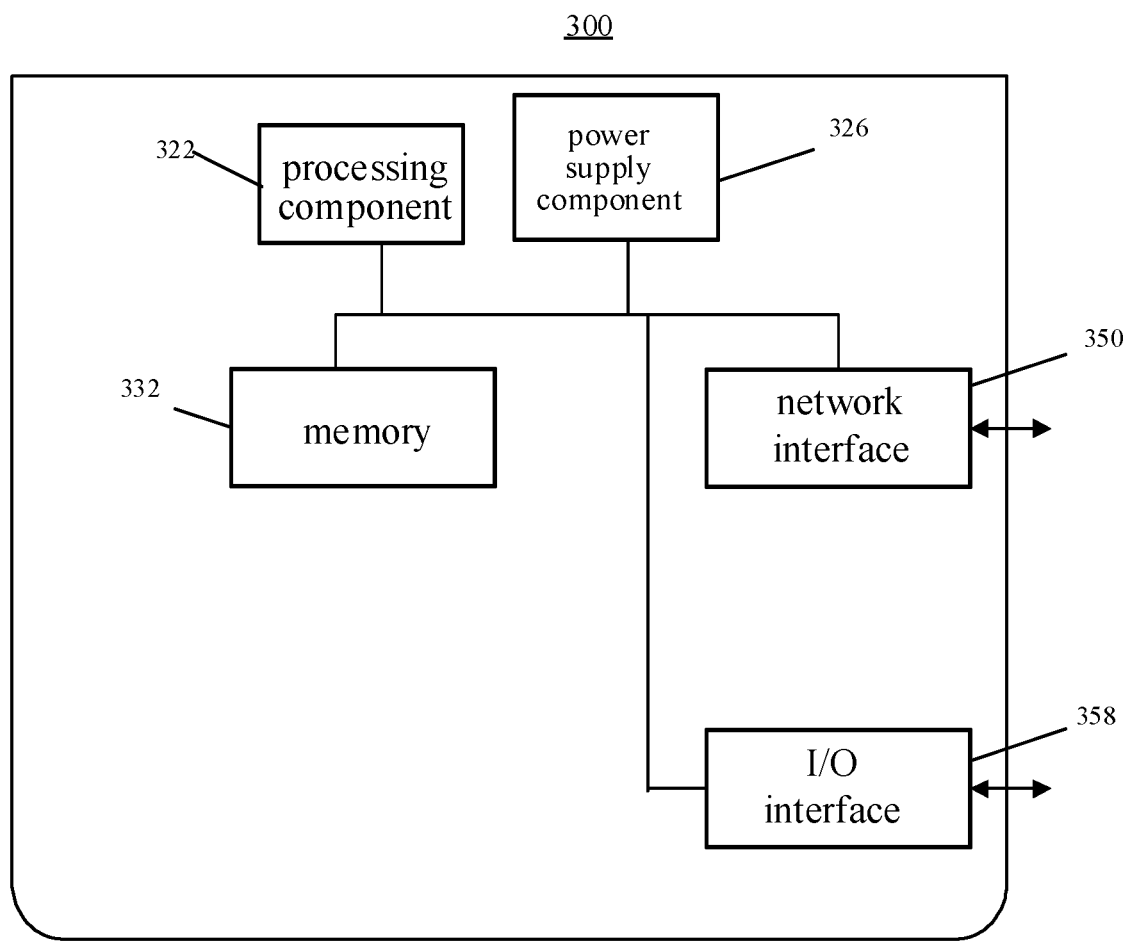
FIG. 5 is a block diagram illustrating another device for resource configuration according to an embodiment.

FIG. 5 is a block diagram illustrating a device 300 for resource configuration according to an embodiment. For example, the device 300 may be provided as a server. As illustrated in FIG. 5, the device 300 includes a processing component 322, which further includes one or more processors, and memory resources represented by a memory 332, which are configured to store instructions executed by the processing component 322, for example, an application. The application stored in the memory 332 may include one or more modules, each of which corresponds to a set of instructions. In addition, the processing component 322 is configured to execute instructions, to perform a network side device in the above method.

The device 300 may further include one power supply component 326 configured to execute power management of the device 300, and one wired or wireless network interface 350 configured to connect the device 300 to a network, and one input/output (I/O) interface 358. The device 300 may operate an operating system stored in the memory 332, for example, Windows Server™, Mac OS X™, Unix™, Linux™, FreeBSD™.

It may be further understood that, "more than one" in the present disclosure means two or above, which is similar to other quantifiers. "and/or", describes the relationship of the association objects, indicating that there may exist three relationships, for example, A and/or B, may represent: any of existing A only, existing both A and B, or existing B only. The character "/" generally means the contextual object is a kind of "or" relationship. The singular forms "a", "the" and "this" are also intended to include plural forms, unless the context clearly indicates otherwise.

It should be further understood that, although the terms "first", "second", "third", etc. may be configured to describe various information, such information shall not be limited to these terms. These terms are only used to distinguish the same type of information, rather than indicate a particular order or importance degree. In fact, "first", "second" and other similar descriptions may be used interchangeably. For example, subject to the scope of this present disclosure, first information may also be referred to as second information, and similarly, and second information may also be referred to as first information.

It may be further understood that, even though operations are described in the drawings in a particular order, it should not be understood as requiring that such operations be performed in the particular order shown or in sequential order, or that all illustrated operations be performed to obtain desirable results. In certain circumstances, multitasking and parallel processing may be advantageous.

After considering the specification and practicing the disclosure here, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims.

What is claimed is:

1. A method for resource configuration, performed by a terminal, comprising:
   determining a first bandwidth part (BWP) and more than one second BWP, wherein at least some of configuration parameters of the first BWP and each of the second BWP are same,
   wherein the first BWP is an active BWP for control signaling transmission and is resided by the terminal for monitoring a physical downlink control channel (PDCCH), the more than one second BWP are BWPs for data transmission of the terminal, center frequency points of the first BWP and each of the more than one second BWP are different, the center frequency point of each second BWP is different, and a bandwidth of each second BWP is less than a bandwidth of the first BWP,
   wherein the method further comprises:
   performing more than one repetitive transmission based on the more than second BWP for transmission of more than one data, wherein the more than one data is frequency-hopping transmitted among different second BWPs of the more than one second BWP;
   determining channel status information of each second BWP;
   determining a completion of data transmission of the second BWP; and
   monitoring the PDCCH on the first BWP.

2. The method according to claim 1, wherein the control signaling comprises at least one of:
   a broadcast message;
   control information related to the terminal; or
   synchronization information.

3. The method according to claim 1, further comprising: sending a first message to a network side device, wherein the first message is configured to report the channel status information of each second BWP, so that the network side device schedules based on the channel status information of each second BWP.

4. The method according to claim 1, further comprising:
   determining a completion of determining the channel status information of each second BWP; and
   monitoring the PDCCH on the first BWP.

5. The method according to claim 1, wherein the method is applied in a cross-slot scheduling mode, wherein the cross-slot scheduling mode indicates that a control signaling used for scheduling and scheduled data are in different slots.

6. A device for resource configuration, comprising:
a processor; and
a memory configured to store instructions executable by the processor;
wherein, the processor is configured to:
determine a first BWP and more than one second BWP, wherein at least some of configuration parameters of the first BWP and each of the second BWP are same,
wherein the first BWP is an active BWP for control signaling transmission and is resided by the device for monitoring a physical downlink control channel (PDCCH), the more than one second BWP are BWPs for data transmission of the terminal, center frequency points of the first BWP and each of the more than one second BWP are different, the center frequency point of each second BWP is different, and a bandwidth of each second BWP is less than a bandwidth of the first BWP,
wherein the processor is further configured to:
perform more than one repetitive transmission based on the more than second BWP for transmission of more than one data, wherein the more than one data is frequency-hopping transmitted among different second BWPs of the more than one second BWP;
determine channel status information of each second BWP;
determine a completion of data transmission of the second BWP; and
monitor the PDCCH on the first BWP.

7. A non-transitory computer-readable storage medium, wherein when instructions in the storage medium are executed by a processor, the processor is configured to:
determine a first BWP and more than one second BWP, wherein at least some of configuration parameters of the first BWP and each of the second BWP are same,
wherein the first BWP is an active BWP for control signaling transmission and is resided by the terminal for monitoring a physical downlink control channel (PDCCH), the more than one second BWP are BWPs for data transmission of the device, center frequency points of the first BWP and each of the more than one second BWP are different, the center frequency point of each second BWP is different, and a bandwidth of each second BWP is less than a bandwidth of the first BWP,
wherein the processor is further configured to:
perform more than one repetitive transmission based on the more than second BWP for transmission of more than one data, wherein the more than one data is frequency-hopping transmitted among different second BWPs of the more than one second BWP;
determine channel status information of each second BWP;
determine a completion of data transmission of the second BWP; and
monitor the PDCCH on the first BWP.

8. The device according to claim 6, wherein the control signaling comprises at least one of:
a broadcast message;
control information related to the terminal; or
synchronization information.

9. The device according to claim 6, wherein the processor is further configured to:
send a first message to a network side device, wherein the first message is configured to report the channel status information of each second BWP, so that the network side device schedules based on the channel status information of each second BWP.

10. The device according to claim 6, wherein the processor is further configured to:
determine a completion of determining the channel status information of each second BWP; and
monitor the PDCCH on the first BWP.

11. The device according to claim 6, wherein the device is applied in a cross-slot scheduling mode, wherein the cross-slot scheduling mode indicates that a control signaling used for scheduling and scheduled data are in different slots.

* * * * *